United States Patent [19]

Chapin

[11] 4,184,434
[45] Jan. 22, 1980

[54] LOCOMOTIVE WITH LARGE CREW CAB

[75] Inventor: James R. Chapin, Erie, Pa.

[73] Assignee: General Electric Company, Erie, Pa.

[21] Appl. No.: 822,169

[22] Filed: Aug. 5, 1977

Related U.S. Application Data

[63] Continuation-in-part of Ser. No. 673,497, Apr. 5, 1976, abandoned.

[51] Int. Cl.² .................. B61D 17/10; B61D 33/00
[52] U.S. Cl. ..................... 105/456; 105/61; 105/340; 105/342; D12/195
[58] Field of Search ............... 105/26 R, 314, 329 R, 105/342, 344, 345, 340, 330, 315, 316, 426, 430, 238, 49, 61, 456; D12/38, 39, 43, 195; 98/3

[56] References Cited

U.S. PATENT DOCUMENTS

| D. 149,553 | 5/1948 | Grutzner | D12/38 |
| D. 162,221 | 2/1951 | Proctor | D12/39 |
| D. 168,837 | 2/1953 | Haman et al. | 105/345 |
| 2,090,988 | 8/1937 | Snyder | 105/26 R |
| 2,546,134 | 3/1951 | Watter | 105/315 |
| 2,662,488 | 12/1953 | Clary | 105/342 |
| 2,813,494 | 11/1957 | Haman et al. | 105/340 |
| 2,859,705 | 11/1958 | Cripe | 105/2 |

FOREIGN PATENT DOCUMENTS 371840  11/1906  France ........................ 105/315

Primary Examiner—Joseph F. Peters, Jr.
Assistant Examiner—Ross Weaver
Attorney, Agent, or Firm—Albert S. Richardson, Jr.

[57] ABSTRACT

A locomotive is provided with an enlarged cab having "split level" sections for accommodating the engineer and other members of the train crew. A first upper section includes seating space for the engineer adjacent to the console with good visibility to the front and back, the engineer's line of sight being above the crew members in a lower section of the cab, and on the opposite side of the cab there is an additional upper section that provides an operating station for the engineer's assistant. In the lower section of the cab seating space is provided for at least one crew member. A writing surface (for performing clerical work) adjacent to seating space for the train conductor, with external visibility along a line of sight parallel to the sides of the railroad cars being propelled by the locomotive, is provided either in the lower section or in the additional upper section of the cab. The cab is wider than the engine hood so that the lines of sight of the engineer, engineer's assistant, and conductor are not obstructed by the sides of the hood.

16 Claims, 11 Drawing Figures

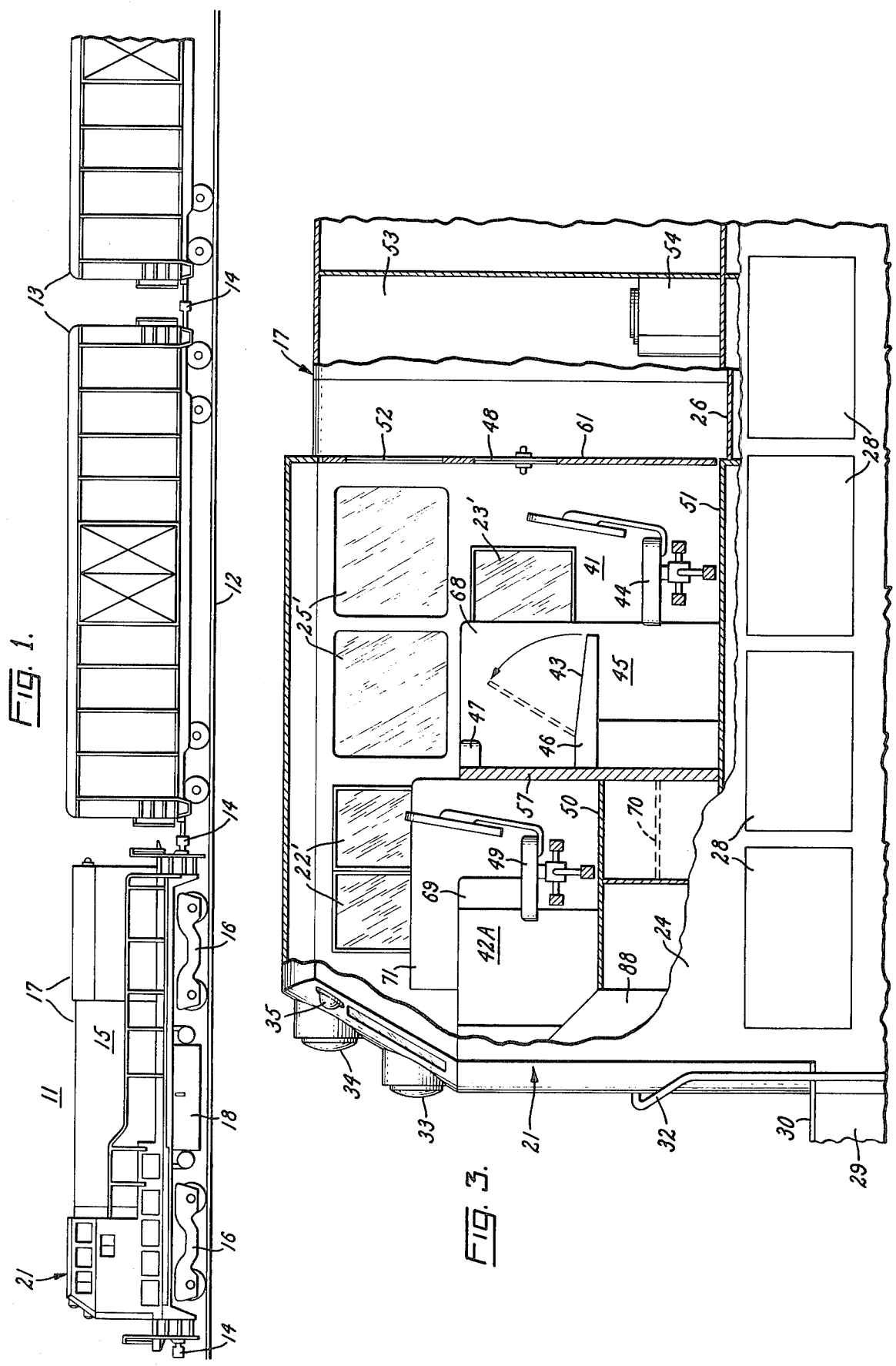

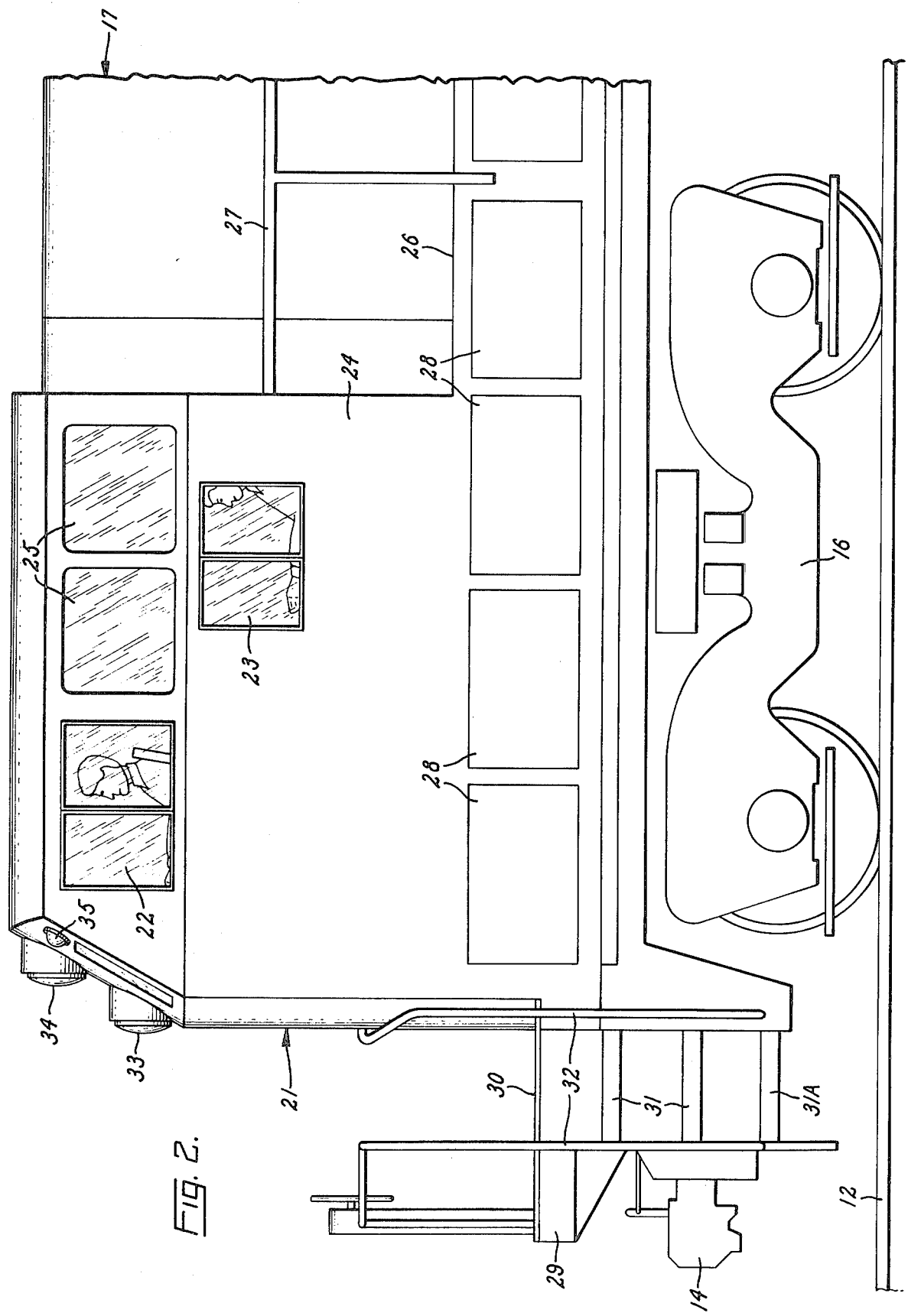

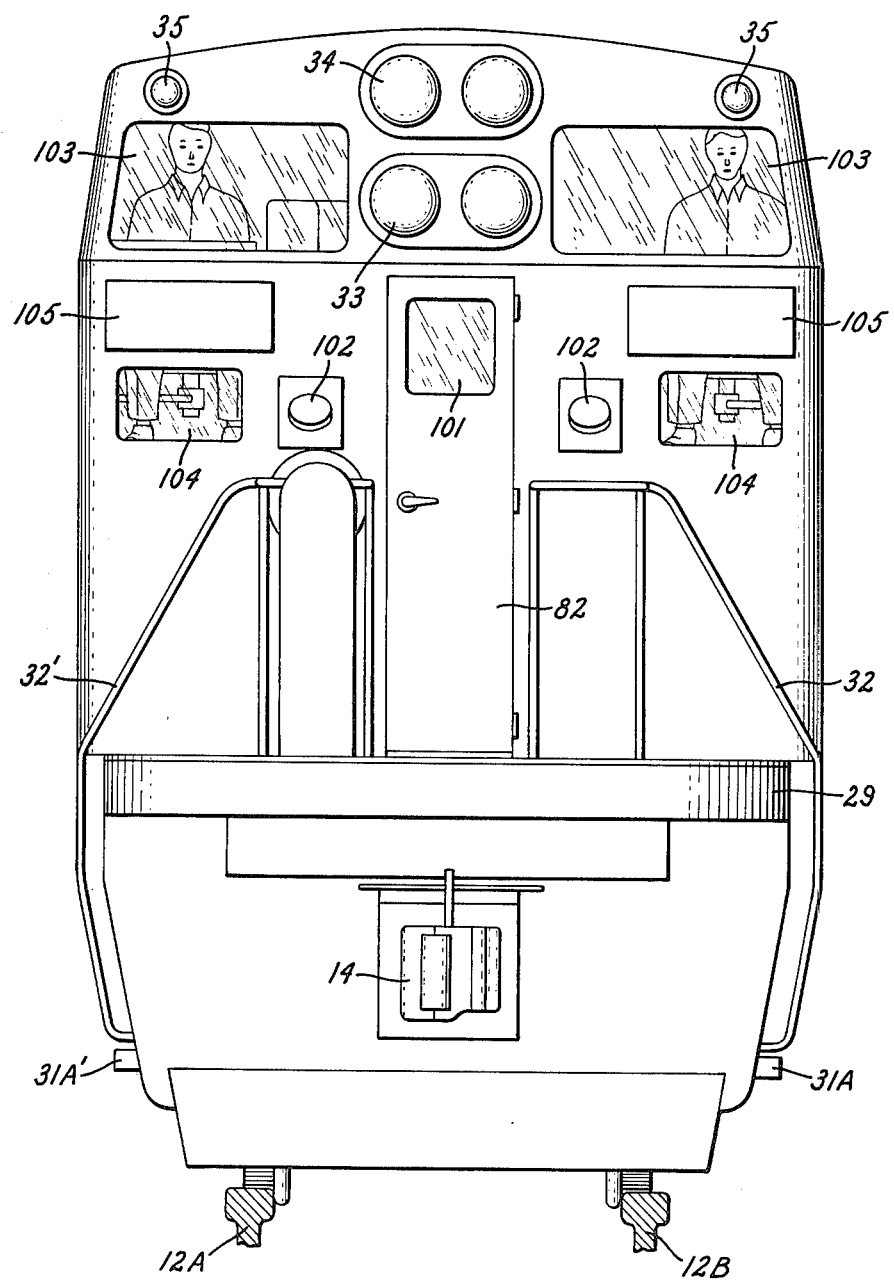

4,184,434

LOCOMOTIVE WITH LARGE CREW CAB

CROSS-REFERENCE TO RELATED APPLICATION

This is a continuation-in-part of application Ser. No. 673,497, filed Apr. 5, 1976, now abandoned.

BACKGROUND OF THE INVENTION

This invention relates generally to railroad locomotives and more particularly to the cab arrangement of a locomotive used to propel a train of freight cars.

It is well known that railroads are an economical and energy-saving form of transportation for hauling bulk freight from points of origin to geographically separated distribution centers. A typical freight train comprises a string of interconnected freight cars which are propelled along a surface track by one or more than one locomotive. The train crew includes an engineer, a conductor, at least one brakeman, and sometimes an assistant for the engineer. The engineer and his assistant operate the train from a cab in the head end locomotive. The conductor and brakemen are responsible for handling the freight cars, and ordinarily they ride in a caboose which is coupled to the rear end of the train. The conductor is in charge of the train and communicates with the engineer by radio or by hand, flag, or lantern signals.

Often the respective cars in a given train have a plurality of different origins or destinations, and consequently the composition of the train is changed from time to time as cars are removed from or added to it. In branchline or short train applications, there is relatively frequent switching of individual cars or of small groups of cars. Each time a freight car is cut out of or onto the train, the trailing caboose has to be first set off and subsequently picked up.

A general objective of the present invention is to eliminate the caboose from freight trains, thereby facilitating removal and addition of the freight cars.

Another objective of the invention is to improve communications among the whole train crew in general and between engineer and conductor in particular.

SUMMARY OF THE INVENTION

In carrying out my invention in one form, the cab of a locomotive is arranged in a plurality of sections located at different elevations, and between these sections there are access regions through which the engineer and other members of the train crew can conveniently pass. In a first upper section of the cab there are disposed a control panel for controlling operation of the power unit of the locomotive and seating space for the engineer adjacent to the control panel, with clear visibility both ahead and behind the locomotive. The line of sight of the engineer when facing the back end of the locomotive is above the crew members in the lower section of the cab. An operating station for a crew member is provided in an additional upper section of the cab having visibility similar to that available in the engineer's section. In the lower section there is disposed seating space for at least one other crew member with visibility along a line of sight generally parallel to the sides of the railroad cars that are being propelled by the locomotive. In a presently preferred embodiment of my invention, the additional upper section of the cab is arranged to accommodate the train conductor, whereas in another embodiment the conductor is stationed in the lower section. In either case, a writing surface for performing clerical work is provided adjacent to the conductor's location. By sharing the same cab the engineer and conductor can more easily communicate with each other. The cab is wider than the adjacent hood (which encloses the aforesaid power unit), whereby the respective lines of sight of the engineer and conductor are not obstructed by the sides of the hood.

A passageway in the cab provides ingress and egress for the engineer, conductor, and other crew members between the aforesaid lower section and a door located centrally in the front end of the locomotive. The aforesaid additional upper section of the cab is spaced from the first upper section by this passageway. On opposite sides of the rear wall of the lower section there are a pair of doors which open onto walkways alongside the hood. The latter doors include window panes for good external visibility from inside both lower and upper sections of the cab. Adjoining the cab, and conveniently accessible to the lower section thereof, there is a separate compartment which includes toilet facilities for the engineer, conductor, and other crew members.

BRIEF DESCRIPTION OF THE DRAWINGS

My invention will be better understood and its various objects and advantages will be more fully appreciated from the following description taken in conjunction with the accompanying drawings in which:

FIG. 1 is a side elevation of a locomotive propelling a plurality of freight cars;

FIG. 2 is an enlarged side elevation of one end of the FIG. 1 locomotive embodying the features of my invention in a first form thereof;

FIG. 3 is a view similar to FIG. 2 with the near side wall broken away to reveal the interior of this embodiment of the locomotive cab;

FIG. 6 is a front elevation of the locomotive shown in FIG. 2;

DESCRIPTION OF THE ILLUSTRATED EMBODIMENTS

Figure 4:
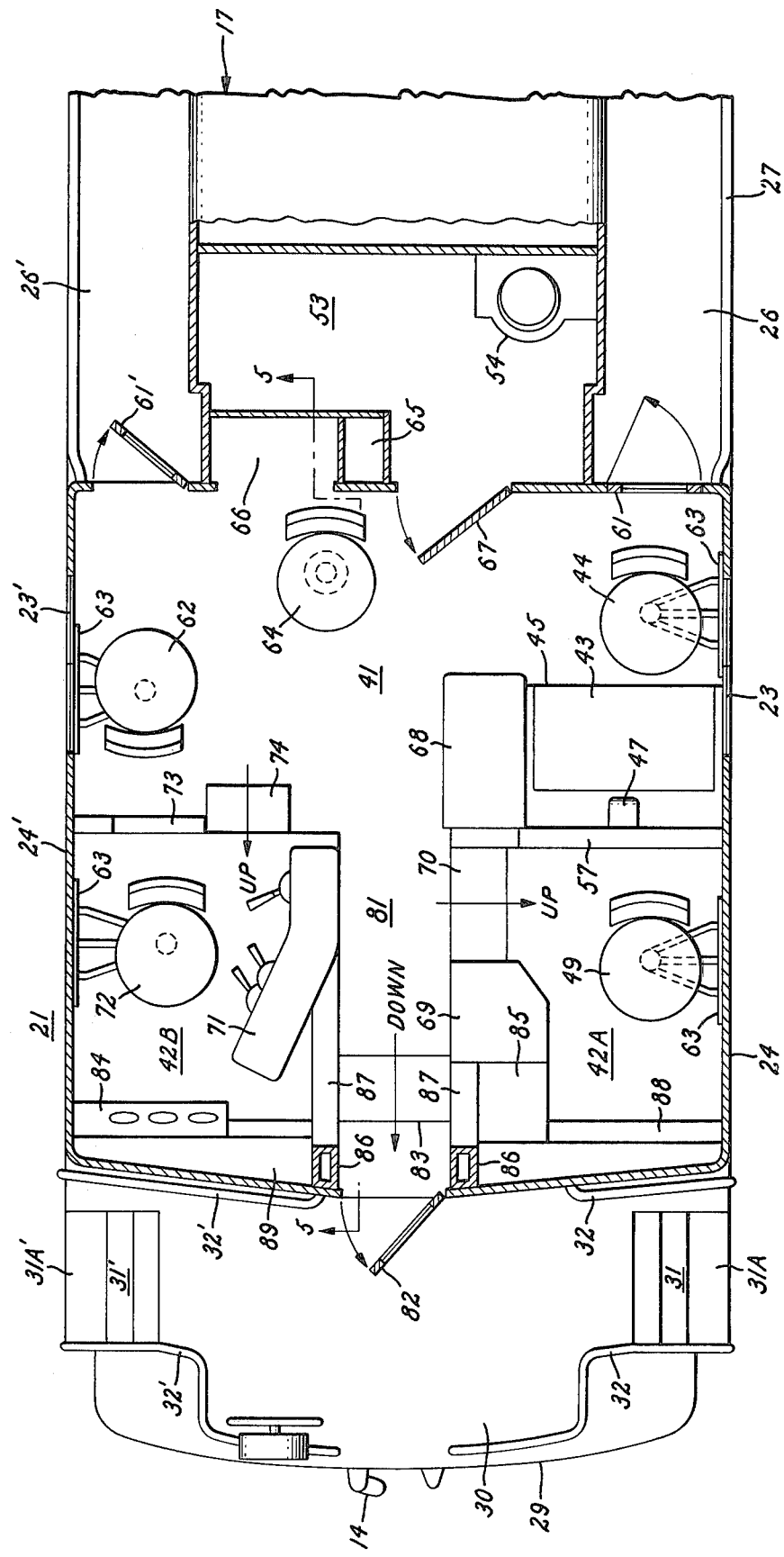
FIG. 4 is a plan view of the interior of the locomotive cab shown in FIG. 3.

FIG. 1 depicts a locomotive 11 propelling a train of unpowered railroad cars along a surface track 12. By way of example the railroad cars have been shown as standard box cars 13 connected to one another (and to the locomotive) by conventional couplers 14 which enable an individual car or a group of consecutive cars to be added to or removed from the train as desired. As viewed in FIG. 1 the train may move either right-to-left, in which case the locomotive 11 runs in its forward direction to pull the trailing cars 13, or left-to-right, in which case the locomotive runs in its reverse direction to push the cars.

The locomotive 11 comprises a body 15 supported by at least two multi-axle trucks 16 which have wheels engaging the track 12. The trucks 16 are provided with suitable means, such as electric motors and gears, for driving the wheels and thereby propelling (or retarding) the locomotive 11. The drive mechanism (not shown) is suitably coupled to a power unit which is part of the locomotive body 15. The power unit is enclosed by a hood 17 and therefore cannot be seen in FIG. 1. It typically comprises a source of electric power, such as a rotating generator or alternator, driven by a prime mover, such as a diesel engine. The illustrated locomotive is thus of the popular diesel-electric type. A fuel tank 18 for the engine is shown under the body 15. Alternatively, the prime mover and alternator could be omitted and the power unit could derive its energy from a wayside source.

The locomotive body 15 further comprises a cab 21 located at the front end of the vehicle ajdacent to the hood 17. While not shown in FIG. 1, a second cab can be located at the back end of the body 15 if desired, with the second cab being essentially the same as the illustrated cab 21 rotated 180 degrees horizontally. An enlarged side elevation of the cab 21 is shown in FIG. 2 which will now be described.

In accordance with my invention, the cab 21 is specially designed to accommodate not only the locomotive engineer, but also the train crew comprising at least two and preferably as many as three or four additional persons. The respective members of a full train crew typically serve as an engineer's assistant (traditionally called the fireman), a conductor, a front end brakeman, and a rear end brakeman. In FIG. 2 the engineer's assistant and the conductor are visible through sliding panel windows 22 and 23, respectively, in the near side wall 24 of the cab 21. The novel interior arrangement of the cab is not discernable in FIG. 2 but will soon be described with the aid of FIGS. 3–5.

In the exterior side wall 24 that has been shown in FIG. 2 there are a pair of fixed windows 25 in addition to the sliding panel windows 22 and 23. A portion of the hood 17 adjacent to the cab 21 is also shown in FIG. 2. As will be apparent in the plan view (FIG. 4), the sides of the hood 17 are located inboard with respect to the sides of the cab 21, and along side the hood behind the cab there is a walkway 26 having a guard rail 27 for safety purposes.

Below the cab 21 and the walkway 26 there is an array of removable panels 28 covering openings in the side wall 24 for access to compartments which house various devices, circuits, and equipment normally utilized in the construction and operation of a locomotive. Outside the front end of the cab there is a portion 29 of the locomotive platform known as the anticlimber extension. Members of the train crew can move with facility between ground level and the elevated deck 30 of the extension 29 by way of a ladder comprising a plurality of steps 31 and two hand rails 32. Profiles of the headlights 33, oscillatory beacon lights 34, and a marker light 35 of the locomotive are shown in FIG. 2 near the top of the front of the cab 21.

FIG. 3 is a side elevation similar to FIG. 2 except with a portion of the near side wall 24 broken away in order to show the interior of the locomotive cab 21. In accordance with my invention, a generally split level cab arrangement is used. More particularly, FIG. 3 reveals that the cab 21 includes a lower rear section 41 and an upper front section 42A. (Actually, as will soon be explained in conjunction with FIGS. 4 and 5, there are two upper sections; the one shown at 42A on the near side of the cab and another one on the far side.)

In the first embodiment of my invention the lower section 41 of the cab 21 includes seating 44 for the conductor adjacent to a writing surface 43 where he can perform clerical work. The writing surface 43 is preferably in the form of a hinged top of a desk 45, and under this top there is a well 46 in the desk to provide storage space for clerical files. For illuminating the writing surface 43, an electric light 47 is located above the desk 45. The light 47 is conveniently mounted on a vertical partition 57 that separates the lower and upper sections 41 and 42A of the cab, and it can be appropriately shielded to avoid disturbing the other crew members. The seating space 44 is preferably a wall hung swivel chair as shown.

When seated next to the desk 45, the conductor can carry out his customary clerical work on the writing surface 43. Way bills and other papers and supplies can be stored in the desk. Alternatively, by swivelling 180 degrees in his chair 44, the conductor can see through a window pane 48 that is provided in the rear of the cab 21. As will soon be more apparent, there is unobstructed visibility for the conductor, when sitting in the chair 44 and facing toward the back end of the locomotive, along a line of sight that extends alongside of the locomotive hood 17 and generally parallel to the sides of the trailing railroad cars. To further enhance his ability to observe cars being cut into and out of the train, the conductor can lean out through the sliding window 23 which is located in the near sidewal 24 of the cab in the vicinity of the chair 44.

In the upper section 42A of the cab 21 there is provided an operating station for the engineer's assistant (i.e., the "fireman"). This section includes another wall hung swivel chair 49. Appropriate windows are provided in the front and rear ends of the cab 21 so that there is clear external visibility for the engineer∝s assistant, when seated in the chair 49, both to the front and to the rear with respect to the direction of motion of the locomotive (see FIGS. 6 and 7). As is indicated in FIG. 3, the floor 50 of the upper cab section 42A is raised with respect to the floor 51 of the lower section 41, and consequently the line of sight of the engineer's assistant, when looking through a rear window 52, in the direction of the hood 17, will be above the head of the crew member who is seated in the conductor's chair 44 in the lower section 41 of the cab.

In FIG. 3 a portion of the near side wall of the hood 17 is also partially broken away to reveal the interior of a separate compartment 53 that adjoins the rear end of the cab 21. This compartment includes toilet facilities for the comfort of the engineer and crew members. The toilet facilities are shown as a simple commode 54 which in practice can comprise a chemical or electrical toilet, a self-contained recirculating unit, or the like.

With reference now to the plan view shown in FIG. 4, the interior of the combined engineer and crew cab will be more fully described. The lower rear crew section 41 is seen to be divided into two parts on opposite sides of the cab 21, each part including seating space for a crew member with visibility along a line of sight that extends alongside of the hood 17 and that is generally parallel to the sides of the trailing railroad cars. The visibility referred to is through window panes in exterior doors 61 and 61' at the rear of the cab (see FIG. 7), which doors open onto the walkways 26 and 26' along the left and right sides, respectively, of the hood 17. As is apparent in FIG. 4, the cab 21 is wider than the hood 17, whereby the lines of sight through the windows in the doors 61 and 61' are not obstructed by the sides of the hood.

The seating space in the right-hand part of the lower section 41 of the cab is preferably a wall hung swivel chair 62 similar to the previously mentioned chairs 44 and 49. Each of these chairs includes a three-leg cantilevered support attached to a horizontally slotted wall bracket 63 so that the chair can be moved fore and aft a limited amount as desired. In addition to the chair 62, a pedestal mounted swivel chair 64 is installed in the lower section 41 at a location near the rear wall of the cab and approximately midway between the left and right side walls 24 and 24', thereby providing seating space for a fourth crew member, usually the front end brakeman. Behind the chair 64 in the rear wall of the cab 21 there is a compartment 65 for mounting apparatus (e.g., the battery switch) associated with the power unit of the locomotive, and next to this compartment there is an alcove 66 for accessories such as water cooler and refrigerator (see FIG. 5).

An interior door 67 in the rear wall of the cab 21 provides convenient access between the lower cab section 41 and the adjoining compartment 53 in the hood 17. As previously described, the compartment 53 includes toilet facilities 54. It also has sufficient space for installing a cab air conditioning unit if desired.

A locker 68 for coats, foul weather gear and the like is provided in the lower section of the cab at the inboard end of the conductor's desk 45. Another locker 69 for tools and the like is located in front of the coat locker 68 but is spaced therefrom by an open region through which the engineer's assistant can conveniently pass between the lower and upper sections 41 and 42A. At the foot of this open region there is a step 70 whose height is approximately one-half the difference in elevation between these two sections.

In the vicinity of the front and right side of the cab 21 there is another upper section 42B. This section includes a console or control panel 71 for controlling operation of the power unit and air brakes of the locomotive, and it also includes seating space 72 (another wall hung swivel chair) for the engineer adjacent to the console 71 with visibility to the front and to the rear with respect to the direction the locomotive moves along the track. The upper section 42B is located at a higher elevation than the lower section 41 of the cab, and therefore when the engineer is facing toward the opposite end of the locomotive, i.e., in the direction of the hood 17, his line of sight alongside of the hood will be above the head of the crew member who is sitting on the rear end brakeman's chair 62 in the lower section. The two sections 41 and 42B are separated by a low partition 73 and an open region, above a step 74, through which the engineer can conveniently pass from one to the other of these sections in the cab.

The two upper sections 42A and 42B of the cab are separated from each other by a passageway which in FIG. 4 is indicated generally by the reference number 81. This passageway provides ingress and egress for the engineer and crew members between the lower section 41 and a door 82 located at the front end of the cab. The door 82 opens onto the platform extension 29. As is better shown in FIG. 5 which will soon be described, the deck 30 of the extension 29 is lower than the floor of the lower cab section 41, and therefore the floor of the passageway 81 includes a stair 83.

Other features of the locomotive cab 21 illustrated in FIG. 4 comprise a gage panel 84 located in the engineer's section 42B, a heater 85 located in the fireman's section 42A, a pair of vertical collision posts 86 and a pair of diagonal braces 87 which frame the front end of the passageway 81, and two sandboxes 88 and 89 which are respectively disposed behind the left and right sides of the platform extension 29.

Figure 5:
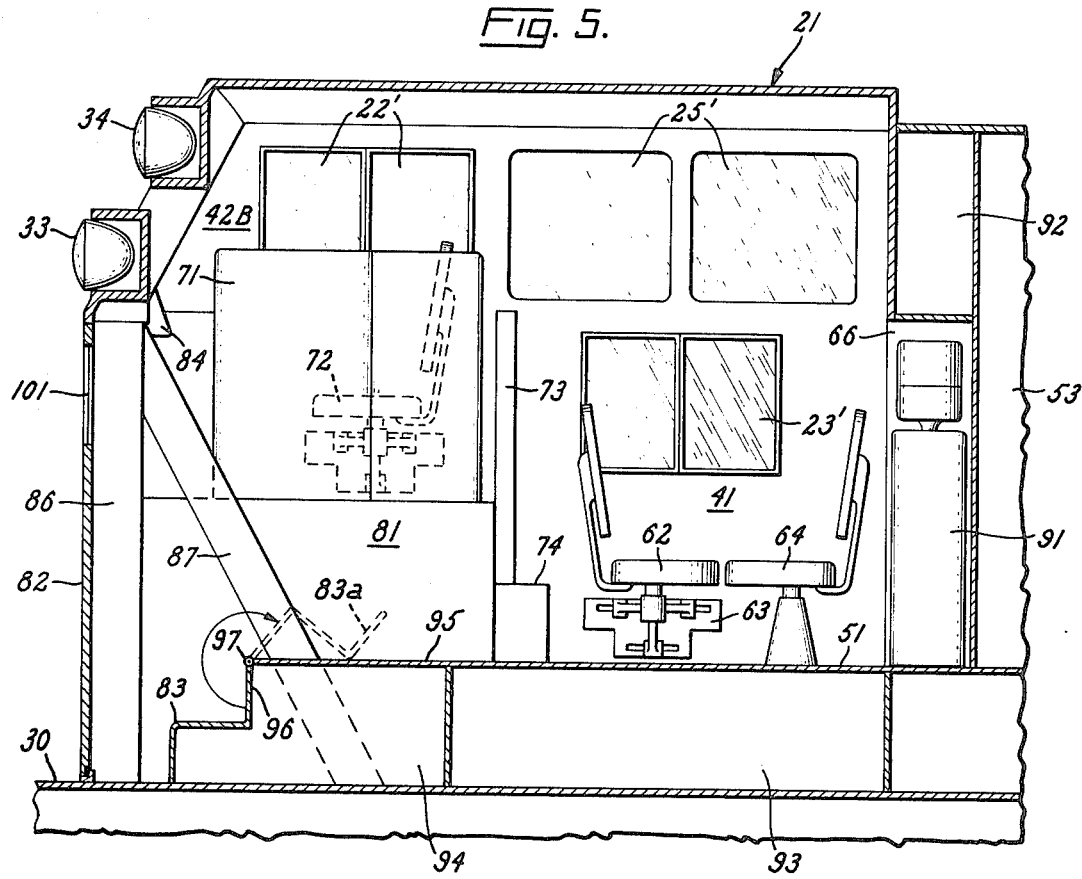
FIG. 5 is a sectional view of the cab taken along lines 5—5 of FIG. 4.

FIG. 5 is a cross sectional view taken along lines 5—5 of FIG. 4 to further illustrate the split level interior arrangement of the cab 21. As is shown in FIG. 5, the far side wall of the cab has a pair of sliding panel windows 22' and 23' and a pair of fixed windows 25' which are the counterparts of the similarly referenced windows in the near side wall (FIG. 2). Recessed in the alcove 66 of the rear wall of the cab is a water cooler 91, and above this alcove is an enclosed compartment 92 for housing monitoring and control equipment associated with the operation of the diesel engine of the locomotive. Under the floor 51 of the upper section 41 of the cab 21 is a chamber 93 in which auxiliary apparatus (e.g., the air brake system) can be located.

FIG. 5 also reveals that the passageway 81 is uncovered and that a storage compartment or locker 94 is provided under the floor 95 of the passageway 81. This compartment is a convenient place to store a spare knuckle for the locomotive coupler 14. To provide access to the compartment 94 when desired, the stair 83 is pivotally mounted so that it can be moved relative to the floor 95. Preferably the top edge of the second riser 96 of the stair 83 is attached to the adjoining edge of the floor 95 by a hinge 97. Swinging the stair to the position shown by phantom line 83a will expose the front end of the storage compartment 94.

Turning now to FIG. 6, the front end of the locomotive will be briefly described. In this view the track 12 is shown as a pair of parallel rails 12A and 12B. Reference character 31A designates the bottom step of the ladder 31 on one side of the anticlimber extension 29, and 31A' designates the bottom step of a similar ladder 31' on the opposite side of this extension. The hand rails associated with these two ladders have been shown at 32 and 32', respectively, in FIGS. 5 and 6. The front center exterior door 82 of the locomotive cab includes a window pane 101. Covered openings 102 for filling the sand boxes are located on opposite sides of this door. As is indicated in FIG. 6, there is a pair of vertically displaced transparent windshields 103 and 104 in the front wall of each of the two upper cab sections 42A and 42B. The engineer, or the engineer's assistant, can look through the lower one 104 of these windows to see hand signals of a crew member who is standing on the bottom step 31A', or 31A, as the case may be. In this embodiment a number box 105 is located in the space between the windows 103 and 104.

Figure 7:
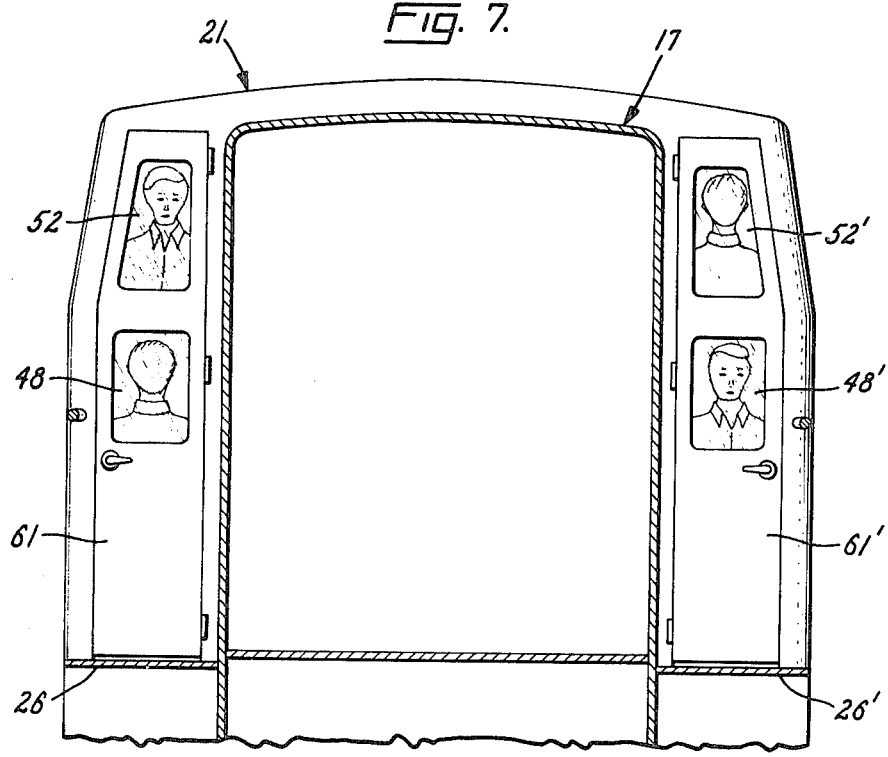
FIG. 7 is a rear view of the locomotive cab.

FIG. 7 is a rear view of the cab 21. The left rear exterior door 61 has two window panes 48 and 52, and the right rear exterior door 61' has a similar set of windows 48' and 52'. If the locomotive were running in its reverse direction, the engineer would face toward the rear of the cab and look out through the upper window pane 52' along a line of sight extending alongside of the hood 17 and generally parallel to the sides of the railroad cars being pushed by the locomotive, and his visibility in this direction would not be obstructed by the rear end brakeman who is sitting in the lower section of the cab. If even better visibility were desired, the engineer and the rear end brakeman could lean out through the sliding windows (22' and 23') that are respectively located in the vicinity of their chairs (72 and 62) along the right sidewall of the cab 21 (see FIGS. 4 and 5). In FIG. 7 it should be noted that the engineer's assistant is shown facing backwards with respect to the position in which he is depicted in FIGS. 2 and 6.

Figure 8:
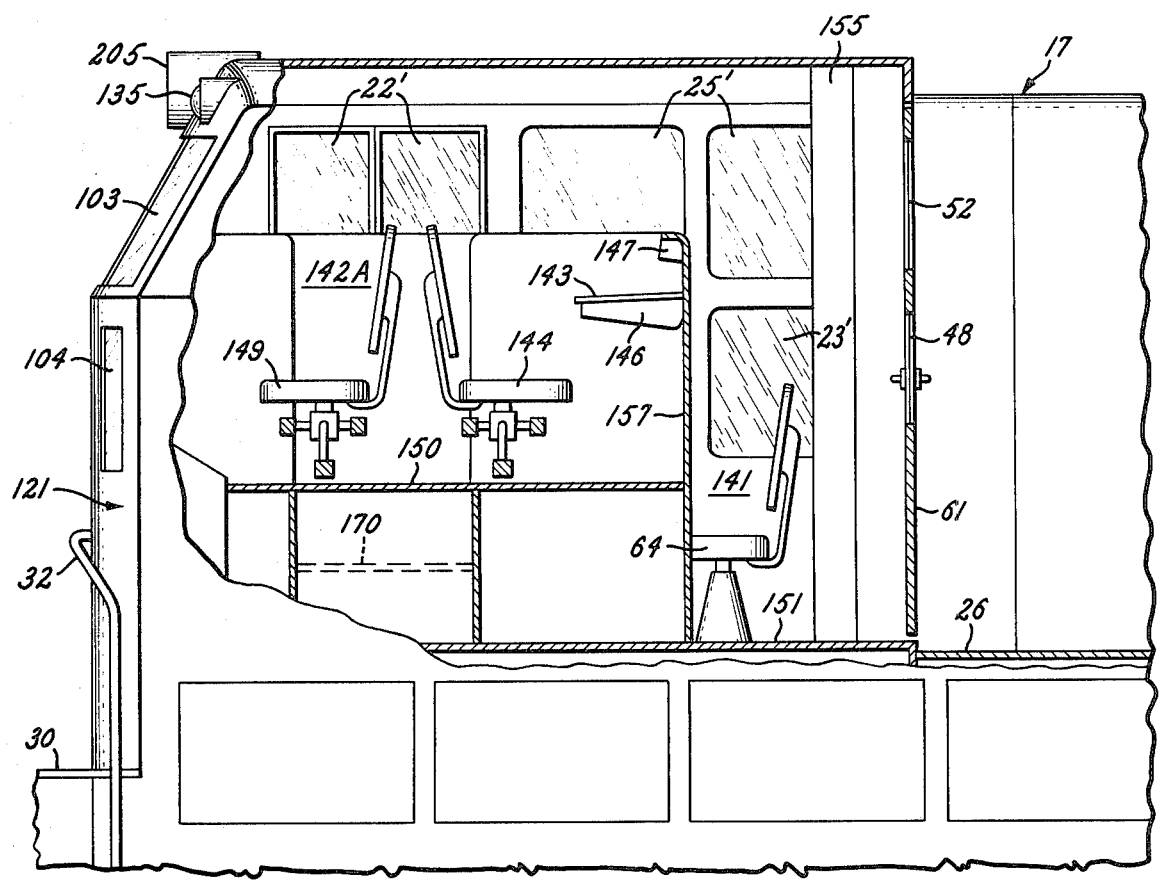
FIG. 8 is a side elevation, with the near side wall broken away, of a different locomotive cab illustrating another embodiment of my invention.
Figure 9:
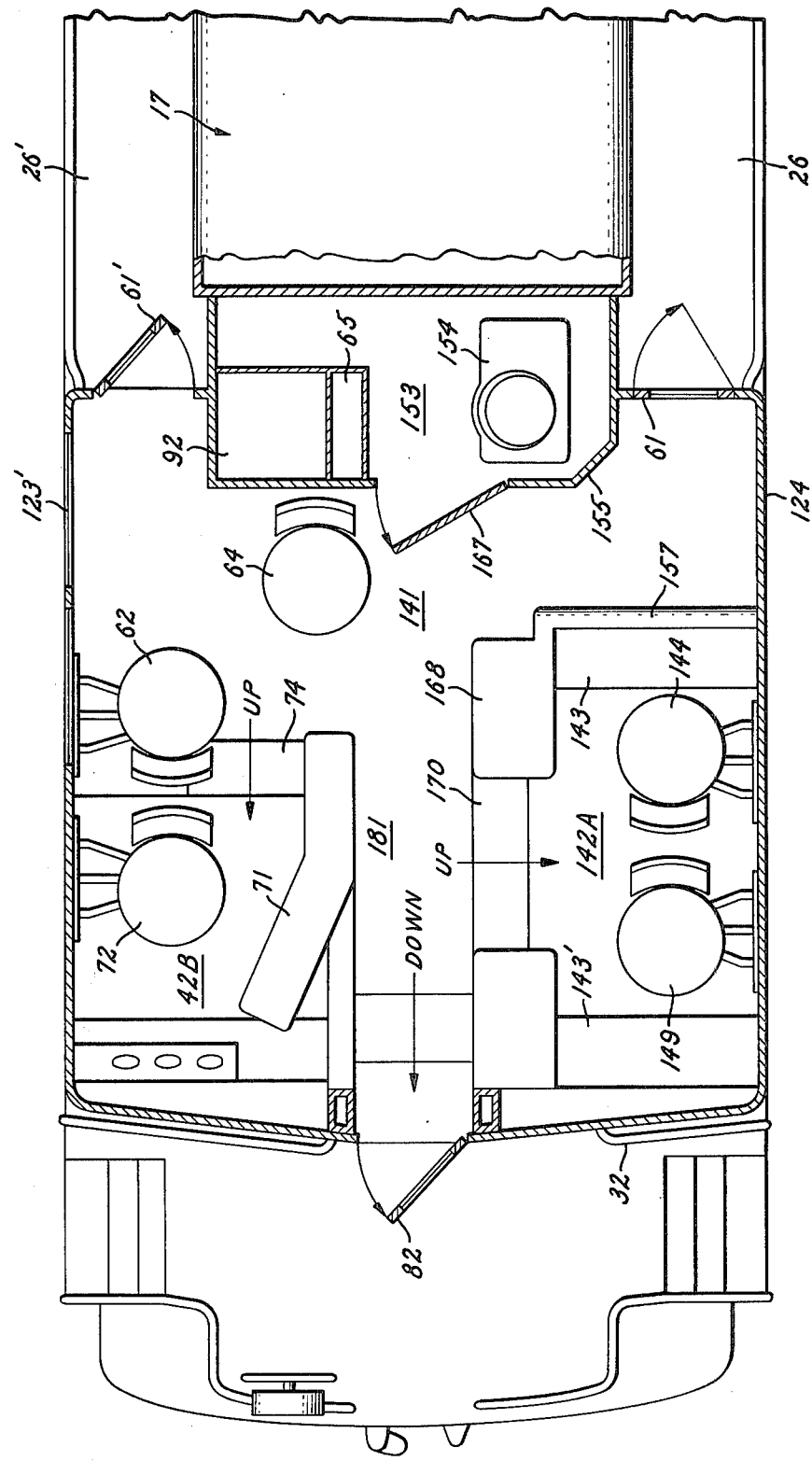
FIG. 9 is a plan view of the interior of the locomotive cab shown in FIG. 8.

Another, presently preferred embodiment of my invention is illustrated in FIGS. 8–11 and will now be described. In this locomotive cab 121, parts that are essentially the same as the parts of the previously described first embodiment are identified by the same reference numbers. As is best seen in FIGS. 8 and 9, the main variation of the cab 121, compared to the previously described cab 21, is that the location of the conductor's chair 144 is raised from the lower section 141 of the cab to the left-hand upper section 142A, thereby improving sight and voice communications between the conductor and the engineer.

FIG. 8 reveals that the cab 121 includes a lower rear section 141 and an upper front section 142A. The floor 150 of the upper cab section 142A is raised with respect to the floor 151 of the lower section 141. In this embodiment the upper section of the cab includes seating 144 for the train conductor adjacent to a writing surface 143 where the conductor can perform clerical work. Appropriate windows are provided in the front and rear ends of the cab 121 so that there is clear external visibility for the conductor, when seated in the chair 144, both to the front and to the rear with respect to the direction of motion of the locomotive.

The writing surface 143 is preferably in the form of a hinged top of a desk, and under this top there is a well 146 in the desk to provide storage space for clerical files. For illuminating the writing surface 143, an electric light 147 is located above the desk. The light 147 is conveniently mounted on a vertical partition 157 that separates the lower and upper sections 141 and 142A of the cab. The seating space 144 is preferably a wall hung swivel chair as shown. When sitting in the chair 144 next to the writing surface 143 and facing toward the back end of the locomotive, the conductor can see through a window pane 52 that is provided in the rear of the cab 121 and has unobstructed visibility along a line of sight that extends alongside of the locomotive hood 17 and generally parallel to the sides of the trailing railroad cars.

The upper section 142A of the cab 121 also includes an operating station for the engineer's assistant. For this purpose, another wall hung swivel chair 149 is provided, and it is located adjacent to the front end of the cab, i.e., the end of the cab that is remote from the hood 17. Consequently the conductor's line of sight when looking in the direction of the hood is not obstructed by the engineer's assistant seated in the chair 149. Alternatively, if desired, the locations of the conductor and engineer's assistant could be interchanged, in which event the writing surface 143 could be disposed adjacent to the front end of the cab 121 in the area designated 143'.

FIG. 9 shows more particulars of the layout of the lower section 141 of the second embodiment of the locomotive cab. Seating spaces for two crew members are provided in this section at 62 and 64. A crew member sitting in the chair 62 will have visibility through the window panes in the rear door 61' along a line of sight that extends alongside of the locomotive hood 17 and that is generally parallel to the sides of the railroad cars being propelled by the locomotive. Since the cab is wider than the hood, this line of sight is not obstructed by the side of the hood. As before, the line of sight of the engineer in the right-hand upper section 42B of the cab is above the head of any crew member in the chair 62. A sliding window 123' is located in the sidewall of the cab in the vicinity of the seating space 62.

An interior door 167 in the rear wall of the cab provides convenient access between the lower cab section 141 and an adjoining compartment 153 which contains toilet facilities 154, and which can also be provided with a wash basin (not shown). In this embodiment of the invention the compartment 153 is defined in part by a wall 155 protruding into the lower section 141 of the cab.

A locker 168 for coats and the like is provided in the lower section 141 of the cab. The upper section 142A is separated from the engineer's upper section 42B by a passageway 181 which provides egress and ingress for the engineer and crew members between the lower section 141 and the front door 82 of the locomotive cab. The engineer's assistant and the train conductor can enter the upper section 142A from the passageway 181 by way of a step 170.

Figure 10:
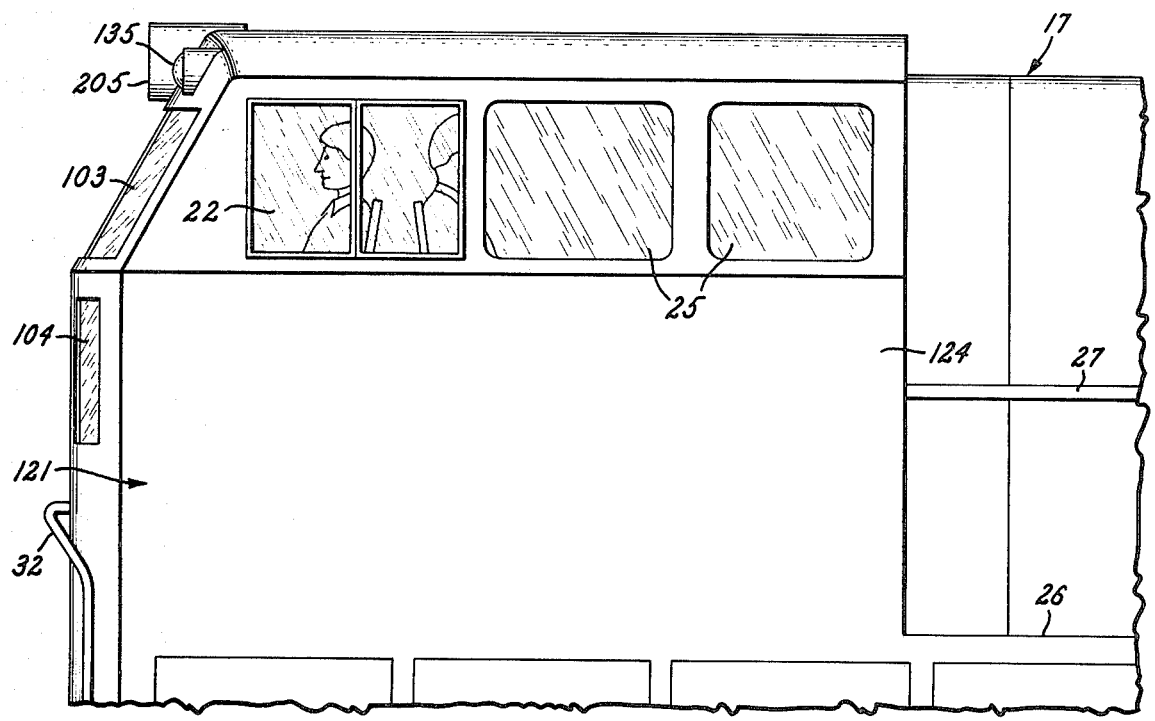
FIG. 10 is a side elevation of the exterior of the FIG. 8 locomotive cab.

FIG. 10 is a side elevation of the exterior of the locomotive cab 121, showing the engineer's assistant and the conductor seated in their respective areas of the upper section 142A. If desired, the middle window in the near side wall 124 of the cab 121 could be a sliding sash rather than the fixed window that has been illustrated.

Figure 11:
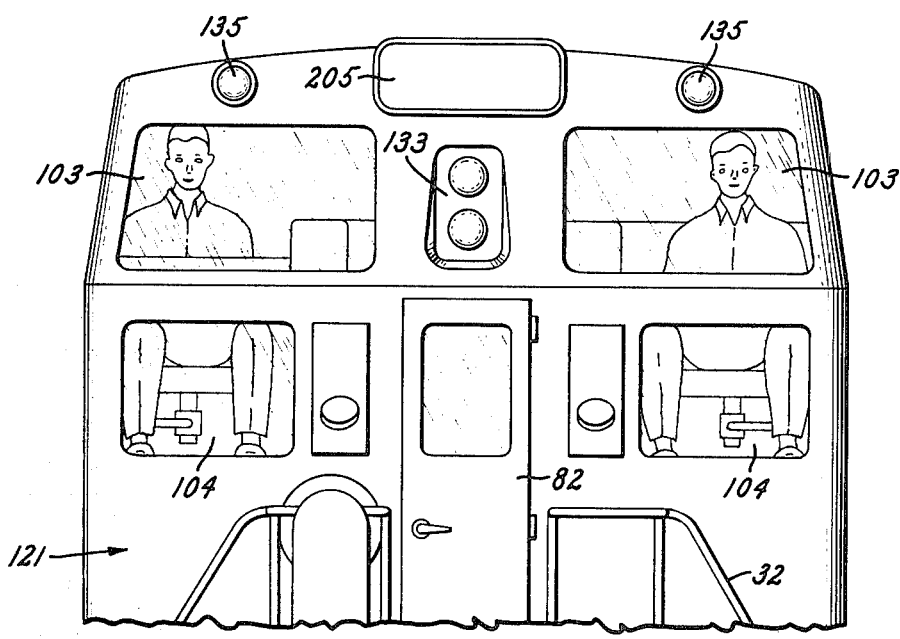
FIG. 11 is a partial front elevation of the FIG. 8 locomotive cab.

As is shown in FIG. 11, the front view of the locomotive cab 121 is somewhat different than the front view of the previously described cab. The headlight 133 has a different design, and only one number box 205 is provided. This number box has been relocated top center. The lower windshields 104 are shown enlarged for greater visibility but could be omitted altogether if desired. A pair of marker lights 135 are provided as shown. A strobe light, revolving beacon, or other suitable warning light (not shown) can be provided on top of the front end of the cab, if desired.

While I have shown and described two embodiments of my invention by way of illustration, other modifications will undoubtedly occur to those skilled in the art. I therefore contemplate by the claims which conclude this specification to cover all such modifications as fall within the true spirit and scope of my invention.

What I claim as new and desire to secure by United States Letters Patent is:

1. A locomotive adapted to propel a train of railroad cars along a surface track, said locomotive having at least one cab for accommodating the engineer and at least two members of the train crew and, adjacent to said cab, a hood for enclosing a power unit of the locomotive, wherein said cab comprises:

(a) upper and lower sections which are respectively located at different elevations in the cab;

(b) a region between said sections through which said engineer and crew members can conveniently pass from one to the other of said sections;

(c) said upper section including a control panel for controlling operation of said power unit and seating space for the engineer adjacent to said control panel with visibility both to the front and to the rear with respect to the direction the locomotive moves along said track, the line of sight of the engineer, when looking in the direction of said hood, extending alongside of said hood and being generally parallel to the sides of the railroad cars being propelled by the locomotive;

(d) said lower section including seating space for a first one of said crew members with visibility along a line of sight that extends alongside of said hood and that is generally parallel to the sides of the railroad cars being propelled by the locomotive; and (e) said cab being wider than said hood so that the lines of sight of said engineer and first crew member are not obstructed by the sides of said hood.

2. The locomotive of claim 1 wherein the line of sight of said engineer is above the head of any crew member seated in the lower section of said cab.

3. The locomotive of claim 1 wherein said cab includes an additional upper section in which an operating station is provided for a crew member serving as the engineer's assistant, the two upper sections being respectively located on opposite sides of said cab, with said additional section having visibility both to the front and to the rear with respect to the direction of motion of the locomotive and the line of sight of the engineer's assistant, when looking in the direction of said hood, extending alongside of said hood and being generally parallel to the sides of the railroad cars being propelled by the locomotive.

4. The locomotive of claim 3 wherein the line of sight of said engineer's assistant is above the head of any crew member seated in the lower section of said cab.

5. The locomotive of claim 3 wherein the two upper sections of said cab are separated from each other by an uncovered passageway which provides ingress and egress for the engineer and crew members between said lower section and a door located at one end of said cab.

6. The locomotive of claim 5 wherein said locomotive includes a platform and said door opens onto an extension of said platform disposed outside said cab at said one end thereof.

7. The locomotive of claim 6 wherein a storage compartment is provided under the floor of said passageway.

8. The locomotive of claim 6 wherein the deck of said platform extension is lower than the floor of the lower section of said cab, and the floor of said passageway includes a stair.

9. The locomotive of claim 8 wherein a storage compartment is located under the floor of said passageway and said stair includes at least one riser and means for pivotally mounting said riser so that the stair can be moved relative to the floor of said passageway to provide access to said storage compartment when desired.

10. The locomotive of claim 1 wherein said lower section includes a writing surface for performing clerical work adjacent to said seating space in said lower section.

11. The locomotive of claim 10 wherein the lower section of said cab is divided into two parts on opposite sides of said cab, each of said parts including seating space for a crew member with visibility along a line of sight generally parallel to the sides of the railroad cars being propelled by the locomotive.

12. The locomotive of claim 11 wherein a pair of sliding windows are respectively located in opposite sidewalls of said cab in the vicinity of the seating spaces included in said lower section.

13. The locomotive of claim 10 wherein said writing surface is illuminated and wherein storage space is provided under said writing surface for clerical files.

14. The locomotive of claim 1 wherein a sliding window is located in a sidewall of said cab in the vicinity of the seating space for said first crew member.

15. The locomotive of claim 1 wherein adjoining said cab there is a compartment conveniently accessible to said lower section through a door.

16. The locomotive of claim 15 wherein said compartment includes toilet facilities for said engineer and crew members.

* * * * *